Dec. 17, 1963   J. H. AUER, JR   3,114,891
TELEMETERING SYSTEM
Filed Nov. 6, 1961   8 Sheets-Sheet 1
FIG. IA
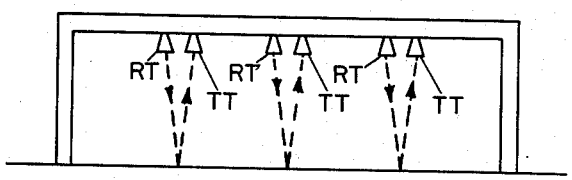
FIG. IB
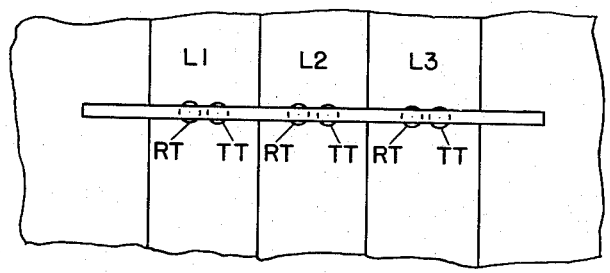
INVENTOR.
J. H. AUER JR
BY
HIS ATTORNEY

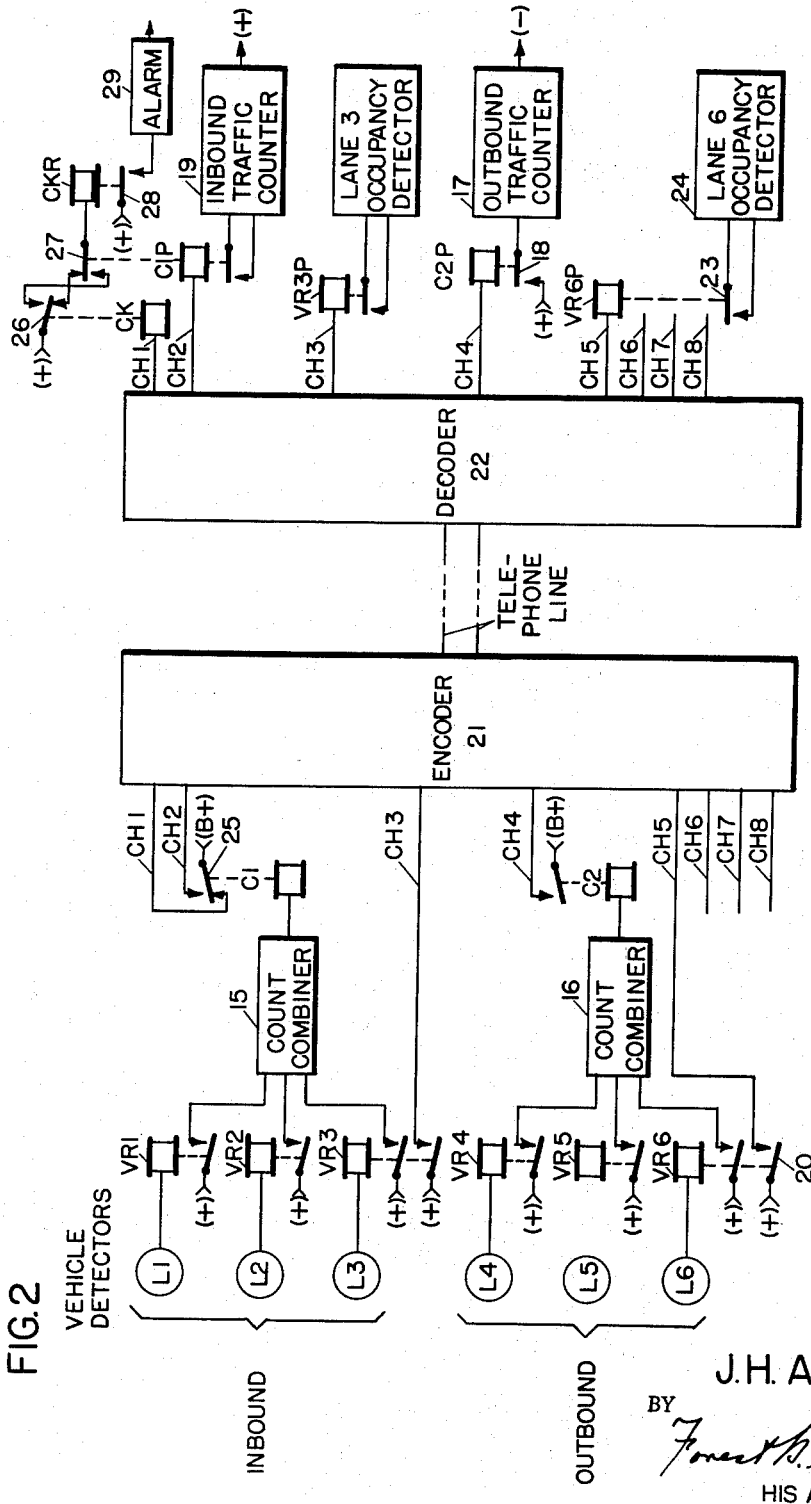

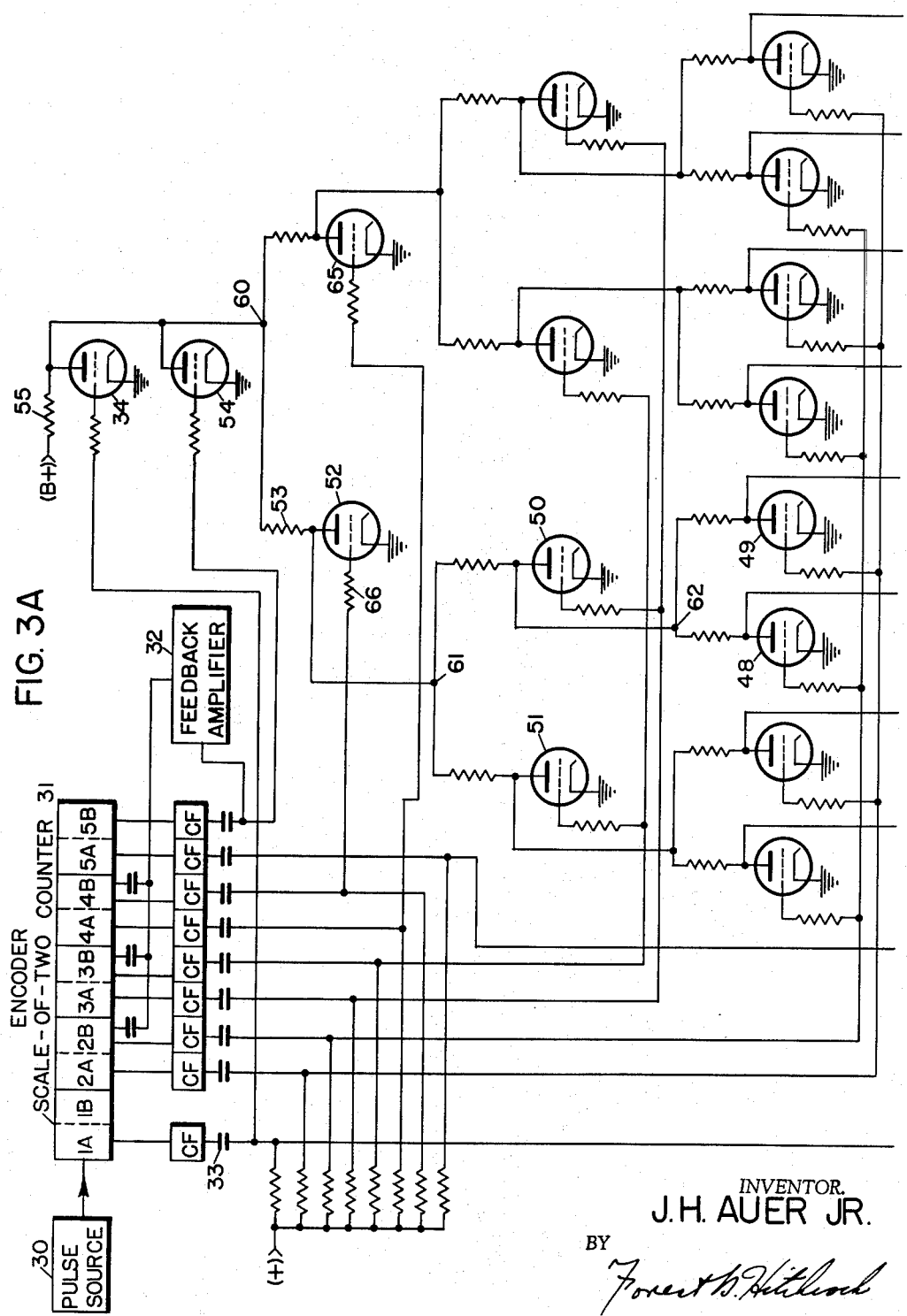

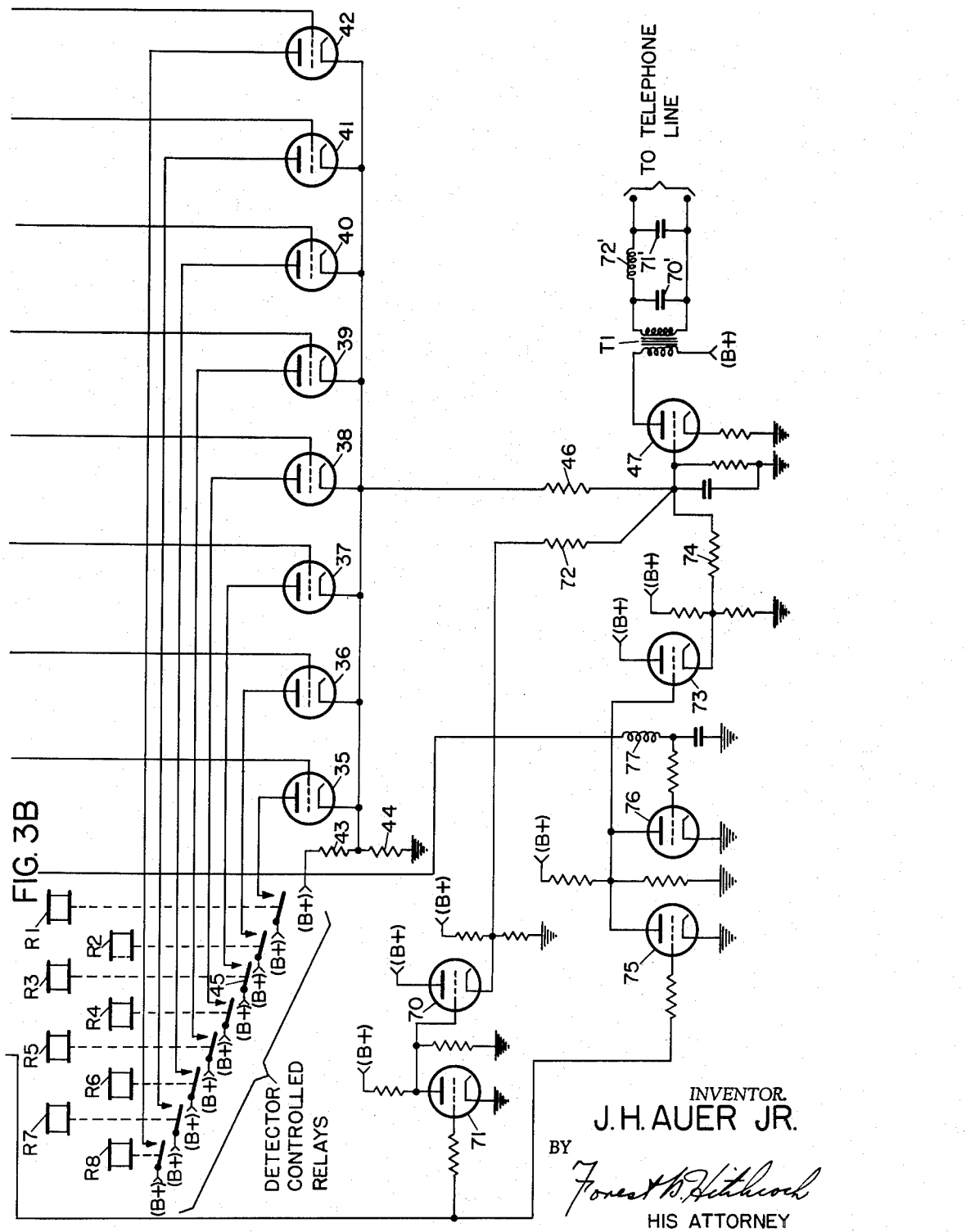

Dec. 17, 1963  J. H. AUER, JR  3,114,891
TELEMETERING SYSTEM
Filed Nov. 6, 1961  8 Sheets-Sheet 5

INVENTOR.
J. H. AUER JR.
BY
HIS ATTORNEY

Dec. 17, 1963   J. H. AUER, JR   3,114,891
TELEMETERING SYSTEM
Filed Nov. 6, 1961   8 Sheets-Sheet 7

FIG. 6

DECODER WAVEFORM DIAGRAMS

A. DECODER OUTPUT 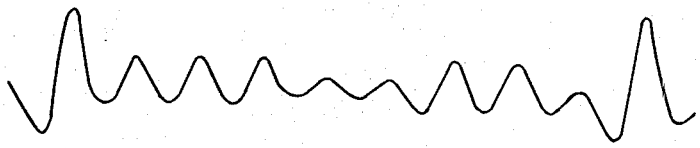

B. PULSE FORMER 83 OUTPUT 

C. CATHODE FOLLOWER 88 OUTPUT 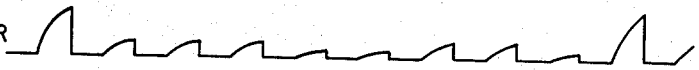

D. TUBE PLATE VOLTAGE 

E. TUBE 93 PLATE VOLTAGE 

F. 1ST. COUNTER STAGE 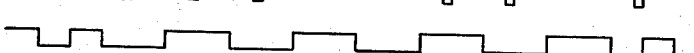

G. 2ND. COUNTER STAGE 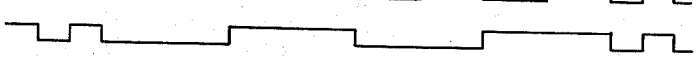

H. 3RD. COUNTER STAGE 

I. 4TH. COUNTER STAGE 

J. TUBE 100 PLATE VOLTAGE 

K. CATHODE FOLLOWER 105 OUTPUT 

L. CATHODE FOLLOWER 106 OUTPUT 

M. CATHODE FOLLOWER 107 OUTPUT 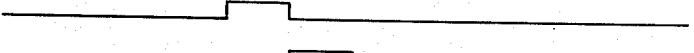

N. CATHODE FOLLOWER 108 OUTPUT 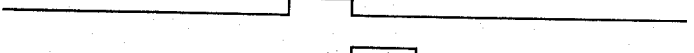

O. CATHODE FOLLOWER 109 OUTPUT 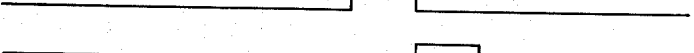

P. CATHODE FOLLOWER 110 OUTPUT 

Q. CATHODE FOLLOWER 111 OUTPUT 

R. CATHODE FOLLOWER 112 OUTPUT 

INVENTOR.
J. H. AUER JR.
BY
HIS ATTORNEY

Dec. 17, 1963  J. H. AUER, JR  3,114,891
TELEMETERING SYSTEM
Filed Nov. 6, 1961  8 Sheets-Sheet 8

INVENTOR.
J.H. AUER JR.
HIS ATTORNEY

United States Patent Office 3,114,891
Patented Dec. 17, 1963

3,114,891
TELEMETERING SYSTEM
John H. Auer, Jr., Rochester, N.Y., assignor to General
Signal Corporation, a corporation of New York
Filed Nov. 6, 1961, Ser. No. 150,547
7 Claims. (Cl. 340—22)

This invention relates to telemetering apparatus, and more particularly pertains to such apparatus as used in a system in which highway traffic data is transmitted from a field location to a central monitoring location.

The telemetering system of this invention, although useable in any of a variety of circumstances, has particular utility in the transmission of data relating to highway traffic conditions. Most expressways now have vehicle counting devices at one or more locations. Each counting station ordinarily includes a plurality of counting devices, usually one for each lane of traffic and each comprising a vehicle detector whose output is connected to a counting and registering device located along the edge of the highway. Each counting station must be periodically visited by an employer whose duty is to read the count registered upon the counting device. This is not only time consuming and thus, costly, but also means that the information obtained is never up-to-date. "Staleness" of the data is not of especial significance when, for example, vehicle count information is required only in order that long range planning as to future road construction may be made; it is, however, a serious drawback when the data is to be used currently for the control of traffic as by varying the speed limits on the highway in accordance with measured congestion.

It is contemplated that, in practice, each counting station will comprise a plurality of counters perhaps one for each lane of the highway, and each controlled by a respective vehicle detector. The telemetering system of this invention transmits the count data from each counter at the counting location over an ordinary telephone circuit to a central location. Each counting station similarly transmits its count data to the same control location. As a result, there is constantly displayed at the central location, data relating to the number of vehicles passing over each of the several lanes at each counting station. Since the telemetering system continuously and rapidly scans the counters at each counting station, the data displayed at the central location is always up-to-date.

As is shown in detail in the prior application of H. C. Kendall and J. H. Auer, Ser. No. 78,410, filed December 27, 1960, and assigned to the assignee of the present invention, vehicle occupancy, i.e., percentage of pavement which is vehicle-occupied, may be determined in response to a signal which is produced for each passing vehicle and has a duration proportional to the length of time required for the vehicle to pass a given point. Such a signal may be produced at a counting station by so organizing the vehicle detector that it operates a relay from its normal position in response to each vehicle for a length of time substantially equal to the time required for that vehicle to pass a given point, i.e., to pass through the detection zone defined by the detector. In order for vehicle occupancy to be measured accurately at the central location, it is necessary that the vehicle signal be reproduced there accurately, at least to the extent of having its duration closely match that of the signal generated at the counting location. Any delay by the relay at the central location in registering the actuation of the detector-controlled relay upon entrance of the vehicle into the detection zone must be substantially matched by the delay time incurred in registering the restoration of the detector-controlled relay at the time the rear of the vehicle leaves the detection zone.

The telemetering system of this invention comprises a continuous scanning system which periodically scans each detector-controlled relay at a counting location, and generates a distinctive signal on each scanning cycle whose makeup is dependent on the conditions of the relays scanned. Each cycle comprises a plurality of pulse periods, at least one for each relay scanned and on each pulse period either of two distinctive signals is transmitted according to whether the respective relay scanned on that particular pulse period is dropped away or picked up. At the central location a decoder analyses the code received and controls a plurality of relays accordingly. One such relay may be controlled by the decoder for each pulse period in a cycle and each relay is controlled to pick up or drop away in accordance with the particular one of the two distinctive signals that is recorded on the respective pulse period. The present invention is so organized that all of the required data for the typical six lane counting station may be transmitted over a simple telephone line circuit but with successive scans following one another quickly to ensure that a change in condition of any relay at the counting location will, very shortly thereafter, be reflected in the condition of the corresponding relay at the receiving location.

Since only a relatively small amount of data need be transmitted from a counting station, each scanning cycle need consist of only a relatively small number of data pulse periods. In one embodiment of this invention, it was found that eight pulse periods were sufficient since this permitted the scanning of each of six counting relays leaving two pulse periods as spares. One of the spare pulse periods may be used to provide a system check as will be described. A distinctive synchronizing pulse which is in addition to the eight data pulse periods demarcates the successive cycles and is made distinctive by reason of its high amplitude. On each of the successive data pulse periods either an intermediate amplitude or low amplitude of signal may be transmitted. Thus, the signal that is produced comprises a plurality of spaced, unidirectional voltage pulses each of which is selectively of one of three different amplitudes. This signal is applied through a filter whose output is connected to the telephone line circuit and the signal thus appearing on the telephone line circuit comprises essentially a sinusoidal wave form, each successive cycle of which is respectively of one of three different amplitudes as just described.

In producing this signal, the successive pulse periods in each scanning cycle are demarcated by a scale-of-two divider driven by a continuously operating pulse generator. A matrix of electronic tubes is employed and is controlled by the scale-of-two counter in a novel manner to formulate the successive pulse periods of each cycle. Decoding apparatus is employed for use at the central location which also includes a scale-of-two counter driven by the pulses appearing on the received signal. Amplitude differentiating means is employed which extracts the synchronizing pulse and causes the counter to be reset at the beginning of each received scanning cycle and also differentiates between the two different amplitudes of data pulses on a peak to peak basis. A matrix of electronic tubes, similar to that provided for the counting station is also provided and is controlled by the scale-of-two counter.

An object of the present invention is to provide a telemetering system that is relatively low in cost and yet provides for the rapid transmission of data.

Another object of this invention is to provide a telemetering system wherein data may be transmitted rapidly over an ordinary telephone line circuit.

Still another object of this invention is to provide a system wherein data as to vehicle counts and highway lane occupancy may be made available at a central location.

Another object is to control a relay in response to a received signal in such a way that it has substantially equal pick-up and drop-away times.

Other objects, purposes, and characteristic features of the invention will, in part, be obvious from the accompanying drawings and, in part, pointed out as the description progresses.

To simplify the illustrations and facilitate in the explanation of this invention, the various parts and circuits which constitute the embodiment of the invention are shown diagrammatically and certain conventional elements are disclosed in block form since the drawings have been made more with the purpose of making it easy to understand the principles and mode of operation than to illustrate the specific construction and arrangement of parts that might be used in practice. Thus, the symbols (+) and (−) are used to indicate the positive and negative terminals, respectively, of a suitable source of direct current, which may be used for the operation of various relays and the like. The symbol (B+) and the symbol for a ground connection indicate the connections made to the opposite terminals of a source of higher voltage having an amplitude which is suitable for the operation of various electron tubes and the like.

In describing this invention, reference will be made to the accompanying drawings in which like parts are designated by the same references in the several views and in which:

FIGS. 1A and 1B illustrate one manner in which the individual vehicle detectors may be positioned over the several lanes of a multi-lane highway;

FIG. 2 is a block diagram showing how the telemetering apparatus of this invention may be used in a system wherein traffic data is transmitted to a control location;

FIGS. 3A and 3B is a detailed circuit of the encoder of the telemetering system of this invention;

Figure 4:
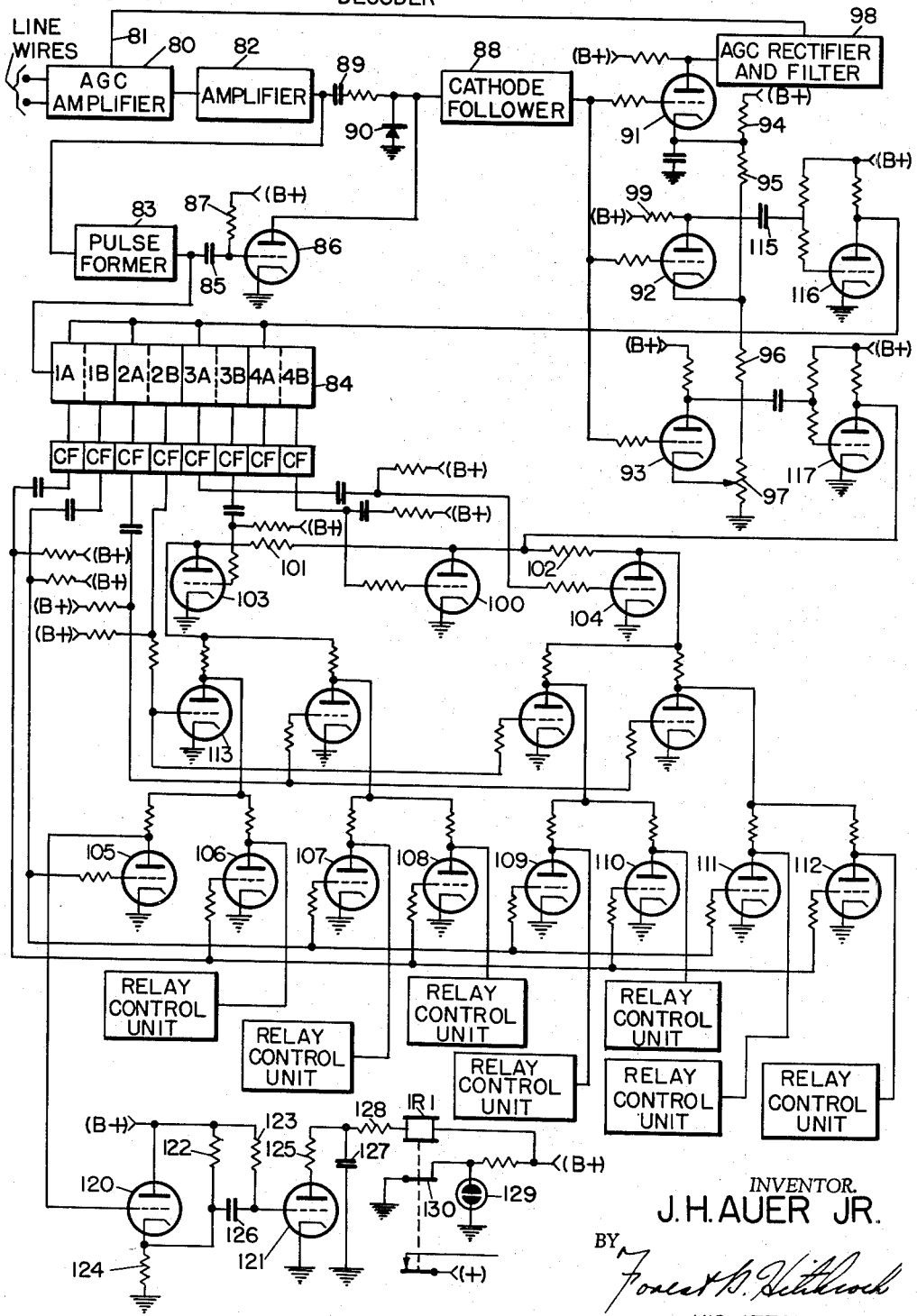
FIG. 4 is a detailed circuit of the decoder for the telemetering system of this invention.
Figure 5:
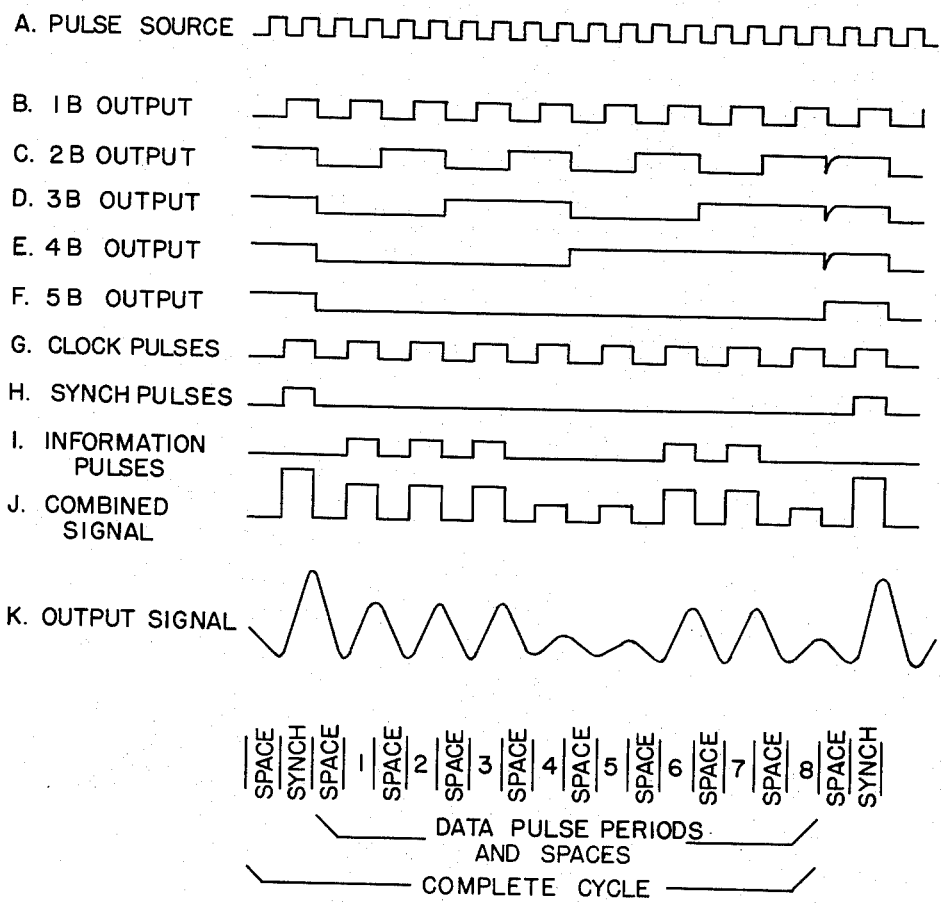
Figure 7:
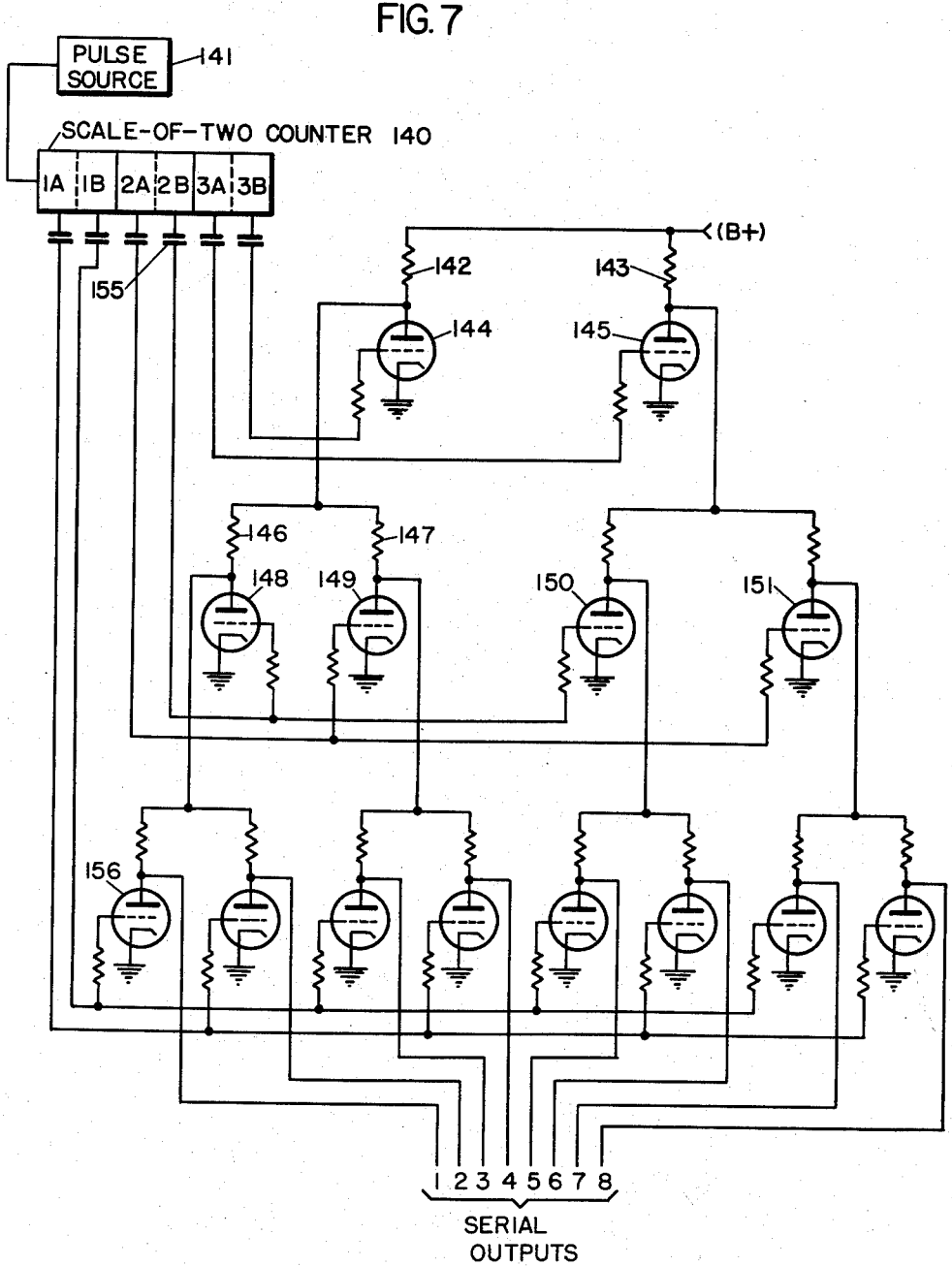

FIGS. 5 and 6 are waveform diagrams illustrating various voltage waveforms appearing respectively in the encoder and decoder of FIGS. 3 and 4; and FIG. 7 is a circuit diagram of a more generalized form of the matrix shown also in FIGS. 3 and 4 and which converts the binary output of the counter to a serial form of output.

Although the telemetering system of the present invention has utility wherever it is desired to transmit data economically and rapidly, it is of special utility as previously indicated in transmitting data relating to highway traffic conditions. For this reason, the detailed description of the invention will be given with reference to its use in connection with the transmission of highway traffic data.

In FIGS. 1A and 1B, three of six lanes of an expressway are shown. Any of several different types of vehicle detectors may be employed to detect vehicles traveling in each lane. It will be assumed, however, for the purposes of the present invention that the vehicle detector used for each lane is of the type disclosed in the prior application of Kendall et al., Ser. No. 808,736, filed April 24, 1959, now Patent No. 3,042,303, and assigned to the assignee of the present invention. In such a vehicle detector, a transmitting transducer TT and also a receiving transducer RT are positioned directly over each lane as diagrammatically illustrated in FIG. 1A. The transmitted energy from the transducer TT defines a detection zone as is also shown in FIGS. 1A and 1B in that the entry of a vehicle into the detection zone is immediately registered by associated vehicle detection apparatus. A relay associated with each vehicle detector is actuated from its normal condition and remains actuated for as long as the detection zone is occupied by the vehicle. The successive actuations of this relay for any particular lane of traffic thus provide a count of the number of vehicles travelling over that lane. In addition, the amount of time that the relay is in its vehicle detecting condition provides a measure of vehicle occupancy for that lane, as is disclosed in the prior application of Kendall and Auer, Ser. No. 78,410, previously referred to.

FIG. 2 illustrates one way in which the telemetering system of the present invention may be used in the telemetering of data concerning traffic conditions. A vehicle detector is shown for each of the six lanes L1–L6 respectively. The first three of these detectors L1–L3 are actuated by traffic in the inbound lanes and the other three L4–L6 by traffic actuated in the outbound lanes. Each detector controls an associated relay VR1–VR6 which is shown as being normally dropped away but which is picked up throughout the length of time that the associated detection zone is occupied by a vehicle.

Ordinarily, it is not necessary to provide count data with respect to each individual lane. Instead, it is adequate if the system provides one over-all count for all the vehicles in one direction and a separate over-all count for all vehicles moving in the opposite direction. If this combining of counts for the several lanes handling traffic in one direction is made prior to the telemetering of the count information, then only one channel in the telemetering system need be used for the transfer of this information. It is for this reason that the count combiner 15 is used. Thus, actuation of any one of the three detector relays VR1, VR2 or VR3 will control the count combiner 15 to pick up its output relay R1. Of course, it frequently happens that two or more of the relays, VR1, VR2 or VR3 are picked up substantially at the same instant as a result of cars in adjacent lanes entering their respective detection zones at the same time. The count combiner 15 provides successive actuations of its output relay R1 for such simultaneous actuations of the vehicle detector relays. For example, if relays VR1 and VR2 pick up simultaneously, relay C1 will pick up and drop away twice in succession, thereby converting the simultaneously occurring counts into time-spaced counts. The vehicle detectors for the lanes L4–L6 all provide inputs to a similar count combiner 16 which also produces successive actuations of relay C2 in response to simultaneous actuations of two or more of the vehicle detector relays. The circuit organization of the count combiners 15 and 16, incidentally, is not a part of this invention and has accordingly not been shown in detail herein. The prior applications of Bolton, Ser. No. 841,389, filed September 21, 1959 and Ser. No. 82,903 may be referred to for a detailed disclosure of such count combiners.

To permit counting at the central location of the number of outbound vehicles, for example, that pass the counting station, it is only required that the telemetering system continually sense the condition of relay C2 and constantly make available at the central location information as to the condition of relay C2. The actuations of relay C2 can then be counted by a conventional counter at the central location. If desired, a relay C2P may be provided at the central location, and this relay may be controlled by the telemetering system to "follow" relay C2 at the counting station. Each time that relay C2 picks up and then drops away in response to a passing vehicle, relay C2P (which is normally picked up and is dropped away only when relay C2 is picked up) will drop away and then pick up. Each such actuation of relay C2P may be made effective to add a count to a counter 17 by applying energy thereto through closed back contact 18 of relay C2P. A similar counter 19 counts the actuations of relay C1P and thereby counts the number of inbound vehicles passing the counting station.

Vehicle occupancy information may be obtained from the vehicle detector associated with any one lane. As previously stated, lane occupancy is a function of the time that the corresponding vehicle detector relay is in its vehicle-detecting condition. To measure occupancy of a lane at the central location, it is necessary that the telemetering system constantly sense the condition of the detector relay and then make the information as to relay condition available at the central location where it may be used to control occupancy measuring apparatus of the type disclosed in the already-mentioned application Ser. No. 78,410. More specifically, as shown in FIG. 2, the picking up of relay VR6 closes front contact 20 so that energy can be applied from (B+) to the encoder 21. As will presently appear, this will cause a relay VR6P to be dropped away for a length of time which closely matches the picked-up time of relay VR6. In other words, the telemetering system of this invention on one of its repetitive scans will sense that relay VR6 is picked up and front contact 20 thereof is closed. On each successive cycle, encoder 21 will transmit a signal to the decoder which includes the information that relay VR6 is picked up. When this information has been transmitted on several successive scanning cycles, relay VR6P is dropped away by decoder 22. Once relay VR6 has dropped away, front contact 20 will open and remove energy from the respective input of encoder 21. The transmitted signal will indicate this fact on the pulse period allotted to the transmission of information respecting the condition of relay VR6. When this altered signal has been transmitted repeatedly on perhaps three or four successive cycles, relay VR6P will pick up. Since the delay time in effecting drop away of relay VR6P is substantially the same as is involved in picking this relay up, the total amount of time that relay VR6P is dropped away closely matches the amount of time that the corresponding relay VR6 is picked up. Relay VR6P, through its back contact 23, controls the input to the lane 6 occupancy detector 24 which provides a measure of lane occupancy in accordance with the amount of time that relay VR6P is dropped away as is disclosed in application Ser. No. 78,410, previously referred to. The details of this apparatus form no part of this invention and are, therefore, not described in detail here.

It is generally only required that occupancy data be determined for one in-bound lane and one out-bound lane at any counting station. The reason for this is that experience has shown that the occupancy of a particular lane is generally representative of the occupancy of the other lanes handling traffic in the same direction. This is especially true under high occupancy conditions when occupancy data is most useful.

The integrity of the line circuit between the encoder and the decoder is, of course, vital to the operation of the system. It is, therefore, desirable to provide a means for checking the line circuit. This is done, according to the present invention, in a manner which not only continuously checks the telephone line, but also checks whether both the encoder and decoder are operating properly. Use is made of one of the channels in the telemetering system as a check channel. More specifically, the relay C1, which is picked up once for each vehicle passing along lanes L1–L3, causes energy to be applied to encoder 21 through front contact 25 of relay C1. This results, within a few milliseconds delay, in the dropping away of relay C1P connected to decoder 22. Counter 19 at the central location registers the number of actuations of relay C1P as already described. Relay C1 at the counting station not only accomplishes this function but also causes energy to be applied selectively through back contact 25 of relay C1 to the channel 1 input of encoder 21. The input to channel 1 is always the opposite of that applied to channel 2; thus, if energy is applied to the channel 1 input, it is not applied to the channel 2 input and vice versa. Therefore, if the system is operating properly, only one or the other of relays C1P or CK should be picked up at any time. Relay CKR is provided in order to check that this condition is being met. Thus, if either of these relays, C1P or CK is picked up at any instant but with the other one dropped away, as is required, then energy is constantly applied to the winding of relay CKR through contacts 26 and 27 of relays CK and C1P respectively. However, if relays C1P and CK are both picked up or both dropped away for a time interval in excess of the drop-away time of check relay CKR, then relay CKR will drop away and the closure of its back contact 28 will energize alarm 29 and thereby indicate that the system is not operating reliably and that maintenance is required.

In referring to the detailed circuit diagram on FIG. 3, a pulse source 30 is shown which provides a square wave form of voltage as shown at line A of FIG. 5. This wave form is applied to the scale-of-two counter 31. In the embodiment of the invention shown, it is desired that eight pulse periods be included in each repetitive cycle. It is necessary, in addition, to demarcate the space occurring between each two successive data pulses so that sixteen counter operations must occur in order that the pulse periods and their alternate spaces may be demarcated. Moreover, one additional pulse period and related space must be provided to demarcate each successive cycle and this requires that the counter 31 have a counting capacity of eighteen and include five binary stages.

The scale-of-two counter 31 may be of any of various well-known types and may comprise for each stage an interconnected pair of electron tubes, one of which is fully conductive at any one time and the other fully nonconductive. Each counter stage is operated to its opposite condition in response to the occurrence of a negative-going voltage variation obtained from the previous stage or, as in the case of the first stage, from the pulse source 30. Therefore, the operation of the counter occurs in the manner illustrated by the wave forms at lines B through F of FIG. 5. These wave forms show that the operation of the counter is entirely conventional for the first eight steps. However, when the fifth stage is operated at the begininng of the ninth step (the synch pulse period), the cathode follower associated with the right-hand half of this stage supplies a pulse to the feed-back amplifier 32. The resulting output pulse from the feed-back amplifier 32 is applied to the second, third and fourth counter stages, thereby restoring each of these to the condition it was in just prior to the last operation of the fifth stage. This produces a distinctive ninth pulse period upon which a distinctive synchronizing pulse is transmitted. Moreover, all the counter stages are now again in the condition they assume at the beginning of a cycle so that further pulses from pulse source 30 cause the counter to go again through a complete cycle of operation.

Before describing in detail the operation of the matrix of triode tubes which is illustrated in FIG. 3, it is believed expedient to describe in general what is sought to be accomplished through the use of this matrix. More specifically, a series of eight cathode follower tubes 35–42 is shown in FIG. 3 with their cathodes all connected together and to the junction of voltage dividing resistors 43 and 44 connected in series between (B+) and ground. It is desired that a positive pulse of voltage appear on the common cathodes of these tubes for each pulse period upon which a distinctive high amplitude pulse is desired to be transmitted, but that no cathode pulse be provided in any pulse period where a low amplitude pulse is to be transmitted. (Incidentally, as will be described, a still higher amplitude of pulse is transmitted at the time of a synch pulse, and, for this reason, it is preferable to refer to the different amplitudes of pulses in the eight data pulse periods as being either of "low" or "intermediate" amplitude.) Whether an "intermediate" or "low" pulse is transmitted on any pulse period is, in turn, determined by the conditions of the relays R1–R8. (When the telemetering system is to be used in a system of the kind shown in FIG. 2, any of the relays R1–R8 may correspond to any of the relays which are shown in FIG. 2 as controlling the application of input signals to encoder 21 such as relays C1 or VR6, for example). Thus, if relay R3 is picked up, its front contact 45 will be closed so that (B+) is then connected through this front contact 45 to the plate of cathode follower tube 37. On each successive scanning cycle, as the control grid of this tube 37 is driven positively on the third pulse period of the cycle, a positive cathode pulse will be produced and will be applied through coupling resistor 46 to the control grid of tube 47. However, if relay R3 is dropped away, then no cathode pulse will be produced on the third pulse period.

The manner in which cathode followers 35—42 have their control grids successively driven positive on the eight respective pulse periods of a cycle will now be described. The control grid of tube 37 is connected to the plate of tube 48. The plate of this tube is connected in parallel with the plate-cathode circuit of tube 49, and the plates of both these latter tubes are respectively connected through their plate resistors to the plate of tube 50. Both tubes 50 and 51 have their plates connected through respective plate resistors to the plate of tube 52, and the plate of tube 52 is, in turn, connected through its plate resistor 53 to the plates of tubes 54 and 34 which are also connected in parallel.

The (B+) operating potential for all of these tubes is obtained through the connection of the plates of tubes 54 and 34 through a common plate resistor 55 to the (B+) source of voltage. In order for the grid of tube 37 to receive a sufficiently high voltage to permit this tube to conduct when it receives plate voltage through contact 45 of relay R3, it is clear that all of the series of tubes connected between the grid of tubes 37, up to and including tube 34, must be nonconductive. If any one or more of the tubes in the series is conductive, its conductive plate cathode circuit will provide a low impedance circuit to ground and thus make it impossible for a high voltage to be applied to a further tube in the series. More specifically, the voltage at junction 60 can be at a high potential, near that of the (B+) source, only if both tubes 34 and 54 are cut off. The junction 61 can receive a high potential only if tube 52 is also cut off. In a similar manner, junction 62 can be at a high positive potential only if tube 50 is cut off. Lastly, the grid of tube 37 can receive a high positive potential only if tube 48 is cut off. Thus, it is only when tubes 34, 54, 52, 50, and 48 are all simultaneously cut off that there will be a high voltage at the plate 48. The manner in which the counter 31 controls the tubes of the matrix so as to cause the cathode follower tubes 35–42 to be successively driven positively will now be described.

The control grid of tube 34 receives its voltage from the cathode follower associated with the left-hand half of the first stage of counter 31. The voltage that is thus obtained is similar to, but directly out of phase with respect to the voltage shown at line B in FIG. 5 which represents the voltage derived from the right-hand half of this same first stage. (In each case, the wave form shown at lines B—F of FIG. 5 represents the output voltage provided by the right-hand half of the corresponding stage; the output voltage provided by the left-hand half is 180° out of phase with that shown in FIG. 5.) On each pulse period, therefore, tube 34 has its grid-cathode voltage at cut-off so that there can be no flow of plate current of tube 34 through plate resistor 35. On each space between successive pulse periods tube 34 has its grid above cutoff; therefore none of the tubes 35–42 can then receive a high grid voltage.

Tube 54 has its control grid connected to the cathode follower which is associated with the right-hand half of the last or fifth stage of counter 31. As shown at line F of FIG. 5, this voltage is a low level throughout the time that the various pulse periods for the information digits are being demarcated by the first four counter stages. It is only during the time of the synch pulse and the immediately preceding space period that the grid of tube 54 is driven positively. In other words, both tubes 34 and 54 are fully cut off during each pulse period except for the particular pulse period which has been designated as the synch pulse period.

The parallel-connected tubes 52 and 65 are controlled by the fourth stage of counter 31. Tube 52 has its control grid connected through resistor 66 to the cathode follower associated with the right-hand half of the fourth counter stage, and tube 65 has its control grid similarly governed by the voltage produced by the left-hand half of the fourth counter stage. The voltage obtained from the right-hand half of the fourth stage and applied to the control grid of tube 52 is illustrated at line E of FIG. 5, whereas the voltage applied to the control grid of tube 55 is opposite in phase to that shown at line E. From this, it follows that tube 52 is driven to cut off throughout the first four pulse periods following the synch pulse and that tube 65 is driven to cut off only during the remaining four pulse periods.

A similar division occurs with respect to the parallel-connected tubes 50 and 51. The control grid of tube 51 is cut off only during the first two pulse periods and tube 50 is cut off only during the second two pulse periods. Tube 50, therefore, has a high plate potential only during the third and fourth pulse periods.

Considering now the two tubes 48 and 49 whose plates are connected through respective plate resistors to the plate of tube 50, the control grids of these tubes 48 and 49 are controlled by the second counter stage. With respect to the third and fourth pulse periods, tube 49 has its grid driven to cut off only during the fourth pulse period, but tube 48 has its control period driven to cut off during the third pulse period. Out of the eight successive pulse periods which occur between the successive synch pulses, it can be seen, therefore, that tube 48 has a high plate potential only during the third pulse period and that tube 49 has a high plate potential only during the fourth pulse period.

Although each of the cathode follower tubes 35–42 has its control grid driven positively upon a respective pulse period, each tube can conduct only provided that it is receiving a positive plate potential and this can occur only if the respective detector controlled relay R1–R8 (see FIG. 3B) is picked up and its front contact closed to thereby apply the (B+) voltage to the cathode follower plate. The make-up of the code which appears at the common cathode of the tubes 35–42 is therefore dependent entirely upon which of the relays R1–R8 is picked up. For the purposes of the wave form diagram of FIG. 5, it is assumed that relays R1, R2, R3, R6, and R7 are picked up. As a result, a positive voltage pulse appears at the common cathodes of tubes 35–42 only upon pulse periods 1, 2, 3, 6 and 7, since only tubes 35, 36, 37, 40 and 41 can become conductive on their respective pulse periods under these circumstances.

The nature of the signal that is applied to the telephone line wires is governed by the conduction of tube 47 since this tube includes in its plate circuit the primary wiring of transformer T1, whose secondary wiring is connected through a pi filter including capacitors 70' and 71' and inductor 72′ to the telephone line which leads to the decoder of FIG. 4.

The control grid circuit of tube 47 receives three different input signals. One of these is the signal which is produced at the common cathodes of tubes 35–42 as previously described. Another input signal is received from the first stage of counter 31 through amplifier inverter 71 and cathode follower 70 and consists of a positive voltage pulse for each pulse period. Such a positive pulse occurring without a simultaneous pulse from cathode followers 35–42 drives the grid of tube 47 only slightly positive so that only the low amplitude of pulse is transmitted on that pulse period. If, on the other hand, a positive pulse from cathode followers 35–42 is applied to an input of tube 47 and, concurrently therewith, another positive pulse is applied through resistor 72 to demarcate the pulse period, then tube 47 becomes more highly conductive on that pulse period and an intermediate amplitude pulse is transmitted on that pulse period. The second input to the grid of tube 47 is obtained from the output of cathode follower 70 whose grid is controlled by the voltage obtained from triode 71. The grid of tube 71 is controlled by the voltage derived from the left-hand half of the first stage of counter 31. As already described, this voltage is opposite in phase to that appearing at line B of FIG. 5 so that tube 71 is driven to cut off upon each pulse period. The plate voltage of tube 71 thus is at a relatively high voltage throughout each pulse period and this causes the cathode follower tube 70 to conduct an increased amount of cathode current so that a positive voltage is then applied through resistor 72 to the grid of tube 47.

On each pulse period, therefore, the grid of tube 47 is driven positively so that increased conduction of tube 47 occurs. On any particular pulse period that a positive-going pulse is also obtained from a respective one of the cathode followers 35–42, the control grid of tube 47 is driven even further positive since it then receives positive voltage pulses from two sources simultaneously so that tube 47 then conducts a still greater amount of plate current. This is clearly shown at line J of FIG. 5.

It is desired that the highest amplitude of pulse be transmitted at the time of each synch pulse. To accomplish this, it is necessary that the grid of tube 47 be driven even further positive than it is when a data pulse is to be sent. The required increment of grid voltage for tube 47 is supplied from the cathode follower output of tube 73 which is applied through resistor 74 to the control grid of tube 47. The input to tube 73 is obtained from the common plates of tubes 75 and 76. It is only when both these tubes are simultaneously cutoff that the voltage at their common plates will rise substantially to the (B+) level. This causes tube 73 to conduct with a resultant increase in its cathode potential, thereby causing tube 47 to be driven to a highly conductive condition so that a synch pulse is transmitted.

Tube 75 receives its grid input voltage from the left-hand half of the first stage of counter 31. This tube 75 is therefore driven to cut off throughout the time of each pulse period. Tube 76 receives its grid input voltage through inductor 77 from the left-hand half of the fifth stage of counter 31. This voltage is similar to that shown at line F of FIG. 5 but opposite in phase thereto so that tube 76 is driven to cut-off at the time of each synch pulse, and also throughout the space period immediately preceding the synch pulse. It is only during the time of each synch pulse, therefore, that both these tubes 75 and 76 are simultaneously in cut-off conditions and it is only then that a highly positive potential can be applied through resistor 74 to the grid of tube 47. Tube 47, therefore, conducts its maximum amount only throughout each synch pulse period (see line J, FIG. 5).

The output signal that is applied to the telephone line as the plate current of tube 47 varies between its lowest level (occurring in each space period when all three inputs to tube 47 are removed) and either of three distinct levels on any of the pulse periods. Although the inputs to tube 47 comprise square wave signals, the signal that actually appears in the line varies in a somewhat more sinusoidal fashion as shown at line K of FIG. 5 because of the effect of the transformer T1 and the pi filter comprising capacitors 70 and 71 and also inductor 72.

The alternating signal as shown at line K of FIG. 5 is applied over the telephone line to the decoder whose circuit is shown in FIG. 4. The signal is applied first to an AGC amplifier 80 which has a variable gain dependent upon the voltage applied to it over wire 81. The output of amplifier 80 is applied to a further amplifier 82. The output of amplifier 82 has a wave form somewhat similar to that shown at line A of FIG. 6, but it is, of course of considerably greater amplitude than the input signal to amplifier 80. This output of amplifier 82 is applied to a pulse former 83 which produces square wave pulses, one for each cycle of the alternating current signal and all of substantially the same amplitude, even though the amplitude on any cycle may be of any three quite different values. The output signal of this pulse former 82 is shown at line B of FIG. 6. This signal is applied to the first stage of the scale-of-two counter 84. This counter is similar to the counter shown in FIG. 3 but has only four stages instead of five. This counter thus demarcates the nine pulse periods of each cycle including the eight full message periods and the one synch pulse period. Each counter stage operates to its opposite condition in response to a negative-going voltage wave form obtained either from the preceding counter stage or, as is the case with the first stage, from the output of pulse former 83. Therefore, the operation of the counter is substantially as shown at lines F—I of FIG. 6.

The square wave output of the pulse former 83 is also applied through capacitor 85 to the control grid circuit of triode 86. Each time that the output voltage of pulse former 83 goes negative, the grid of tube 86 is driven to cut-off. Tube 86 thereafter remains cut off until the output voltage of the pulse former 83 goes abruptly positive at the end of the next half cycle. Throughout the time that tube 86 is cut off, the voltage at its plate and at the input of cathode follower 88 can readily follow the variations in amplitude of the output of amplifier 82. This voltage, as shown at line A of FIG. 6, goes positive at this time and because of the clamping action effected by capacitors 89 and diode 90 which prevents the input to cathode follower 88 from going below ground, the amount by which this voltage goes positive with respect to ground is dependent upon the peak-to-peak amplitude of the signal obtained from amplifier 82. Each time that a positive-going voltage variation is obtained from pulse former 83, tube 86 becomes fully conductive so that the voltage at the upper terminal of rectifier 90 is abruptly reduced to near zero and is maintained at this low value throughout the half cycle that tube 86 remains conductive.

The output of cathode follower 88 therefore has substantially the waveform shown at line C of FIG. 6. This waveform illustrates that the voltage amplitude is at its maximum for each synch pulse, at some intermediate voltage level upon the occurrence of each intermediate amplitude data pulse, and is at some substantially lower amplitude for each pulse period on which no data pulse is transmitted.

Tubes 91, 92, and 93 all have the output of cathode follower 88 applied to their respective control grids. These tubes are biased to respectively different levels as a result of the different voltage applied to their cathodes. The cathode of tube 91 has the highest bias voltage; the tube 92 has an intermediate bias voltage; and tube 93 has the lowest bias voltage.

The plate output of tube 91 is connected to the AGC rectifier and filter 98 which in turn feeds a voltage to the AGC amplifier 80. This automatic gain control may be considered of the delayed type, i.e. it does not begin to function until the synch pulse signals reach a certain level. If the synch pulses rise higher than such certain level then this AGC control is very effective to act on the AGC amplifier 80 and thus maintain the level of the synch signals substantially constant at the input to the grid of tube 91. Due to the time constant of the AGC circuit this control is maintained constant throughout the cycle while the intermediate and low pulse signals are being received so that they have no effect upon the AGC circuit. In this way a signal level is maintained as an input to the amplitude signal discriminator embodied in tubes 91, 92 and 93 in spite of varying input signals received over the line wires. More specifically, when a synch pulse rises above the above mentioned certain level, the output of tube 91 is supplied to the AGC rectifier and filter 98 which supplies a direct current output voltage to the AGC amplifier 80 which is proportional to the amount that such synch pulse is above the above mentioned certain value. In other words, an increase in amplitude of received synch pulses will tend to produce greater amplitude output pulses at the plate of tube 91, and this will result in an increase in the amplitude of the voltage provided by AGC amplifier and filter 98, resulting, in turn, in a decrease of gain for amplifier 80. It has been demonstrated that this AGC circuit will result in only slight variations in amplitude of the output from amplifier 82 even for variations in amplitude of the signal obtained from the line wires which may be in the order of 150 to 1. This AGC control is required in order that tubes 92 and 93 will be able to differentiate between the different kinds of received pulses on the basis of their peak-to-peak amplitude.

The amount of cathode bias which is provided for tube 92 is selected to ensure that tube 92 will also have its plate current varied only by a synch pulse. However, the amount of its bias is less than that provided for tube 91 so that tube 92 will produce an output pulse of substantial amplitude across its plate resistor 99 for each occurrence of a synch pulse. These output pulses from tube 92 are applied through a differentiating capacitor 115 to the grid circuit of tube 116 so that the plate of tube 116 produces a positive-going trigger pulse upon each occurrence of a synch pulse (see line D, FIG. 6). Each such trigger pulse is applied to the left-hand half of each stage of counter 84, thereby causing the counter to be reset to a predetermined initial condition. Lines F—I of FIG. 6 illustrate the resetting effect of each synch pulse upon the various stages of the counter.

A still lower amplitude of cathode bias is selected for tube 93. Its bias amplitude is such that its plate current will be varied by both synch pulses and by the intermediate amplitude pulses. Its bias is sufficiently high, however, so that no output pulse will be produced by this tube upon a pulse period on which a low amplitude signal is transmitted. The output pulses of tube 93 are inverted by the trigger circuit including tube 117 and applied to the plate of tube 100.

The purpose of the matrix of tubes shown in the lower portion of FIG. 4 is generally similar to that of the matrix of tubes shown in FIG. 3. Thus, it is desired that the plate potentials of triodes 105–112 be selectively elevated in each pulse period of a cycle in which there is a signal of intermediate level so that a pulse voltage can be selectively applied to the respective relay control circuit for each of the eight pulse periods in a cycle. In other words, throughout the first pulse period of each cycle, it is desired that a high plate voltage be obtained once each cycle from the plate of tube 105 if a signal of the intermediate level is present. This high plate voltage is then applied to the relay control circuit associated with tube 105 and thus during the first pulse period acts to control the condition of indication relay IR–1. If on successive repetitive cycles an intermediate amplitude pulse is received by the decoder on the first pulse period, relay IR–1 will be controlled to drop away. On the other hand, if a low amplitude pulse is received by the decoder on the first pulse period of several successive cycles, then relay IR–1 is to be controlled to pick-up. The manner in which this is accomplished and particularly the manner in which substantially uniform pick up and drop away times are provided for each indication relay will now be described.

Tube 105 will provide a high amplitude of plate voltage only if this tube is itself cut off and if all of the other tubes in the branch of the matrix leading to tube 105 are simultaneously cut off. In other words, for tube 105 to provide a high plate voltage, tubes 105, 113, 103 and 100 must be simultaneously cut off, and also the plate of tube 100 must be receiving a high amplitude of voltage from tube 117. With respect to tube 100, its grid voltage is obtained from the right-hand half of the fourth stage of counter 84. This voltage has substantially the wave form shown at line I of FIG. 6 and tube 100 is therefore, non-conductive at all times except during the synch pulse period. Neither tube 105 nor any of the other remaintubes 106–112 can, therefore, provide a high plate voltage at the time of the synch pulse period. Tube 103 receives its grid voltage from the cathode follower associated with the right-hand half of stage three of counter 84. Line H of FIG. 6 indicates, therefore that tube 103 will be cut off only during the first four pulse periods, tube 113 will be cut off only upon the first two pulse periods since its control grid voltage is governed by the right-hand half of the second counter stage, and line G of FIG. 6 shows that this voltage is at a low level during the first two pulse periods but is at a high level during the second two pulse periods. On these first two pulse periods, tube 105 is cut off only on the first since its control grid voltage is governed by the right-hand half of the first counter stage whose output voltage is shown at line F of FIG. 6. Of the tubes 105–112, only tube 105, therefore, can provide a high output voltage during the first pulse period and then only if an intermediate amplitude pulse is received on such pulse period. A similar analysis will show that each of the tubes 106–112 will be rendered non-conductive upon a respectively different pulse period as is indicated at lines L—R of FIG. 6, but in each case, this will only occur if intermediate amplitude pulse is received on the respective pulse period.

A typical relay control circuit for one channel is shown as including two triode tubes 120 and 121 with a relay IR–1 included in the plate circuit of tube 121. A similar relay control circuit is associated with each of the tubes 106–112.

More specifically, the relay control circuit associated with the first pulse period following a synch pulse will now be described.

Tube 120 is a cathode follower with a fixed threshold bias determined by resistors 122 and 124. Due to this threshold bias, the grid of tube 120 must rise above a certain potential before the cathode will begin to rise. This threshold bias is so selected that only legitimate "on" pulses from the matrix resulting from intermediate level input signals for the corresponding pulse period of the cycle will appear at the cathode of tube 120.

Each time a legitimate pulse appears at the cathode of tube 120, capacitor 126 is charged by the leading edge of this pulse and is effective to drive the grid of tube 121 below cutoff at the trailing edge of the pulse.

The time constant provided by capacitor 126 and resistor 123 is long enough to maintain tube 121 in cutoff condition for a period of time in excess of one complete cycle of pulse periods so that when successive "on" pulses for the first pulse period are received, tube 121 is effectively maintained cut off continuously except for the short interval during which each such "on" pulse occurs. During this short interval of each cycle the cathode of tube 120 rises and replenishes the charge on capacitor 126. When successive "on" pulses for the first pulse period are received, the average plate current of tube 121 is reduced to a sufficiently low value that relay IR-1 cannot be maintained in the energized position. However, due to capacitor 127 in conjunction with resistor 128, relay IR-1 has a slow release characteristic which prevents it from falling away until several cycles of "on" pulses have been received.

When "on" pulses are no longer received tube 121 returns to continuous conduction drawing sufficient plate current to again energize relay IR-1. Again due to capacitor 127 in conjunction now with resistors 125 and 128, relay IR-1 has a slow pick up characteristic. Several successive cycles must occur during which the cycles pulses of low amplitude must be present during the first pulse periods before relay IR-1 will pick up. Proper selection of resistors 125 and 128 provides equal delay in the response of relay IR-1 to both the appearance of intermediate level signals and the absence of intermediate level (i.e. low level) signals.

An indication bulb 129 connected to one of the contacts 130 IR-1 serves to indicate the condition of this relay. Other contacts on this relay may be used to control other devices as desired.

In both FIGS. 3 and 4, the matrix of tubes which provides the function of converting the binary type of output of the scale of two-counter to a serial form of output has been particularly modified to suit the special requirements of the encoder and decoder respectively. Such a matrix system is of quite general utility, however, and it has, for this reason, been shown in a somewhat more generalized form in FIG. 7.

In FIG. 7, a scale-of-two counter 140 is shown which is generally similar to the corresponding counters 31 and 84 which appear respectively in FIGS. 3 and 4. The counter 140 has, however, only three iterated bistable stages, the first of which receives input pulses from pulse source 141 so that the first stage operates from one of its conditions to the other for each pulse obtained from the pulse source 141. Each of the remaining counter stages is operated by a signal obtained from the preceding stage. Each counter stage has two output terminals which provide output voltages thereon which are 180° out of phase with each other. The output voltage thus obtained from the right-hand or "B" half of each stage is similar to that shown at lines F, G and H of FIG. 6. With respect to each stage, the voltage obtained from the left-hand, or "A" half, is directly out of phase with respect to the voltage obtained from the right-hand half.

The matrix comprises a plurality of rows of electron tubes, each having plate and cathode electrodes and also a control grid. The number of rows provided for the matrix is equal to the number of counter stages and, in this case, three rows are provided since the counter has three stages. The number of tubes in the bottom row is equal to two to the power of the number of counter stages, i.e., $2^3$ or 8 in the embodiment shown in FIG. 7. Each row above the bottom row has one-half the number of tubes as the row below, and the top row has two tubes. The (B+) voltage source is applied through respective plate load resistors 142 and 143 to the plates of tubes 144 and 145. The plate of tube 144 is, in turn, connected through respective plate load resistors 146 and 147 to the plates of tubes 148 and 149. The plate of the other tube 145 in the top row of the matrix is similarly connected through individual plate load resistors to the remaining pair of tubes 150 and 151. Each tube of the second row has its plate connected in a similar manner through respective plate-load resistors to the plates of a pair of tubes in the third or bottom row of the matrix.

In any row of the matrix, the control grids or tubes in that row are controlled from a respective stage of the counter, the tubes in the upper row being controlled by the output voltages obtained from the last counter stage, the tubes in the second row having their control grids governed by the voltages obtained from the second-last counter stage, and so on, so that the tubes in the bottom row have their control grids connected to receive the output voltage from the first stage. In any row of the matrix, one of each pair of tubes, (where a "pair" is taken to mean two tubes whose plates are both coupled to the plate of a particular tube in the row above), has its control grid connected through a resistor to one output terminal of the respective counter stage for that row and the other tube of that pair has its control grid connected through a grid resistor to the other output terminal of the same counter stage. More specifically, in the second or middle row in FIG. 7, tubes 148 and 149 comprise a "pair" of tubes for that row just as do tubes 150 and 151. Of the two tubes 148 and 149, one of these tubes, tube 148, has its control grid connected to the B half of the second counter stage; whereas, the other tube of the pair, tube 149, has its control grid connected to a grid resistor to the A half of the second counter stage.

In operation of the circuit organization of FIG. 7, the output voltages obtained from the right-hand or A half of its stage is substantially as shown at line F—H of FIG. 6, and from the description already given, it should be understood that the left-hand or A half of its stage provides an output voltage which is substantially out of phase with that shown for the respective line F—H. When any counter stage is shown as providing the lower level of output voltage, it is to be understood that this lower level of voltage when applied through the respective coupling capacitor to the grids of various tubes in a particular row of the matrix will be effective to provide a cut-off grid-cathode voltage for such tubes. More specifically, when the wave form of voltage of line 6 in FIG. 6 is at the lower of the two levels shown, it will be understood that the right-hand half of the second counter stage has provided a negative voltage pulse through coupling capacitor 155 which will be applied to the control grids of tubes 148 and 150 of the second or middle row of the matrix and this lower voltage level will cause both these tubes to be cut off. At the time these tubes are both cut off, a higher voltage level is then being obtained from the left-hand or A half of the second stage with the result that tubes 149 and 151 whose control grids are connected to this A half of stage 2 will then not be cut off.

The objective of the matrix is to convert the binary type of output of the scale of two-counter 140 to a serial form of output on the terminals 1 through 8 which respectively connect to the plates of tubes 156–163. From the description already given with respect to the similar matrices of FIGS. 3 and 4, it will be appreciated that any tube at the bottom row can provide a high-plate voltage only if that tube and also all of the tubes in the row above from which it can receive a positive voltage are simultaneously cut off. Thus, a high-plate voltage can be obtained from the plate of tube 156 only if tube 156 is cut off and, at the same time, tubes 148 and 144 are also cut off. The manner in which the matrix of FIG. 7 accomplishes this result need not be described in detail here because it has already been quite fully described in connection with FIGS. 3 and 4.

To briefly review the telemetering system herein disclosed, it will be understood that successive cycles of operation include a synch pulse period followed by a number of data pulse periods which for the purposes of this disclosure have been shown to be eight in number. The receiving apparatus comprises a counter for counting the synch pulse and the following data pulse periods regardless of their amplitudes. The synch pulse is employed not only for marking off the beginning of each message cycle but also for establishing the degree of gain (i.e. amplification) of the amplifiers so that the data signals applied to the amplitude discrimination circuits will be of a proper and substantially constant level independent of line circuit signal variations.

The system of this invention provides a novel manner of detecting the amplitude of the pulses. More specifically, the amplitudes of the pulses are discriminated on the basis of their peak-to-peak values measured on the rising edges of such pulses. Obviously the system can be adapted to using the falling edges of each pulse if desired.

Since the counting of the pulse periods is independent of the amplitude of the pulses for such periods, it is then apparent that following the establishment of a particular level of the signal used for discriminating purposes by the amplitude of the synch pulse, it is only necessary to distinguish as to whether a particular intermediate level pulse is above a given minimum level so long as it does not rise to the level of a synch pulse. Then the low level pulses which are used merely for counting purposes are not effective so long as they do not rise to the minimum of an intermediate level pulse.

These characteristics of the present invention make it possible to minimize the effects of amplitude and phase distortion in the signal on the line circuit. This is particularly accomplished because the synch pulses are able to establish a level of signal value rather than an absolute reference point against which signals must be compared.

Having described a telemetering system and one embodiment of a system using such telemetering system, we desire it to be understood that various modifications, adaptations, and alterations may be made to the specific form shown without in any way departing from the spirit and scope of our invention.

What I claim is:

1. In a system for registering at a remote location traffic conditions existing at a designated point along the highway, the combination comprising, vehicle detector means including means being operated from its normal condition in response to each vehicle passing said designated point, encoder means connected to said detector means and supplying an output signal over a communication circuit to decoder means at said remote location, said encoder means scanning each said detector means repetitively and transmitting a distinctive signal to said decoder means at a predetermined time in each scanning cycle in accordance with whether the detector means being scanned is in its normal condition or in its vehicle detecting condition, circuit means at said remote location connected to the output of said decoder means and being operated from its normal condition to a distinctive condition only when said distinctive signal is received by said decoder at said predetermined time in a cycle and on at least a predetermined number of successive cycles, and counting means controlled by said circuit means for registering an additional count for each time said circuit means is operated from its normal condition.

2. The system of claim 1 wherein said encoder scans the condition of said detector means at least once even for the minimum time that said detector means is in its vehicle-detecting condition, whereby even fast-moving vehicles are counted by said counting means.

3. In a data telemetering system, transmitting means for transmitting cyclical series of code pulses each having a distinctive one of at least two different amplitudes and with each series being demarcated by a synchronizing pulse of a still different distinctive amplitude higher than the other two said amplitudes, receiving means connected to said transmitting means over a communication circuit and including variable gain amplifier means, synchronizing pulse detection means coupled to said amplifier means and being responsive only to said synchronizing pulses, means connected to said synchronizing pulse detection means for varying the gain of said amplifier means according to the amplitude of said synchronizing pulses, and responsive means also coupled to said variable gain amplifier means and being distinctively controlled by each received code pulse according to its amplitude.

4. The system of claim 3 wherein said responsive means is distinctively controlled by each received code pulse according to its peak-to-peak amplitude.

5. In a system for providing data at a remote location as to the occupancy of a highway lane at a predetermined measuring point along said lane, the combination comprising, vehicle-operated means governed by each vehicle passing along said lane and being operated from its normal condition for each vehicle a length of time substantially equal to the time required for said vehicle to pass said given point, vehicle occupany registering means at said remote location, telemetering apparatus including a communication circuit coupled between said vehicle-operated means and said vehicle occupancy registering means, said telemetering apparatus comprising means for transmitting a continuous signal comprising repetitive cycles each of which includes a plurality of pulse periods and controlling said signal to transmit on a respective one of said pulse periods a first or second distinctive signal according to whether said vehicle-operated means is in its normal or in its opposite condition respectively, decoder means at said remote location included in said telemetering apparatus and including an output means which is operated from its normal condition only when said distinctive signal has been transmitted on the respective pulse period for at least a predetermined number of successive cycles, means for delaying the restoration of said output means to its normal condition when said distinctive signal has not been produced on several successive cycles by an amount of time substantially equalling that which is required to operate said output means after said distinctive signal has been produced on the respective pulse, and means connected to said decoder means and being controlled to produce an output signal whose amplitude is substantially proportional to the proportion of time that said output means is in its operated condition.

6. In a system for counting at a remote location the number of vehicles passing along a highway at a designated location thereon, the combination which comprises, at least one vehicle-operated means at said designated location and being operated from its normal condition momentarily for each passing vehicle, telemetering apparatus including a communication circuit connected between said designated location and said remote location, said telemetering apparatus including encoder means for transmitting repetitive cycles each comprising a series of pulse periods on any of which a distinctive signal pulse may be transmitted, said telemetering apparatus on each successive scanning cycle being controlled by said vehicle-operated means to transmit a distinctive signal pulse on a particular one of said pulse periods only if said vehicle-operated means is not in its normal condition, said telemetering system transmitting at least a predetermined plurality of said successive cycles throughout the minimum time that is required for a vehicle to pass said detection point, said telemetering apparatus including decoder means at said remote location being governed by the signal pulses received over said communication circuit and including an output means for each of said vehicle-operated means at said designated location, said decoder operating said output means corresponding to said vehicle-operated means to a distinctive condition only in response to the reception of said distinctive signal on said particular pulse period of each cycle over at least a predetermined minimum number of successive cycles, and counting means for registering the number of times that said output means is operated to said distinctive conditions, whereby said counting means registers the number of vehicles passing said designated location.

7. The vehicle counting system of claim 5 in which a separate vehicle-operated means is provided for each highway lane, count-combining means is connected to at least two of said vehicle-operated means, said count-combining means being operated from its normal condition momentarily in response to each operation from its normal condition of a vehicle-operated means to which it is connected, and said count-combining means controlling said encoder means to transmit said distinctive signal pulse on said particular pulse period of each cycle for as long as it is operated from its normal condition.

References Cited in the file of this patent
UNITED STATES PATENTS

| | | |
|---|---|---|
| 2,737,645 | Brass | Mar. 6, 1956 |
| 2,920,247 | Fisher | Jan. 5, 1960 |
| 2,929,967 | Birkeness | Mar. 22, 1960 |
| 2,994,076 | Havens | July 25, 1961 |
| 2,994,860 | Weld | Aug. 1, 1961 |
| 2,999,999 | Bertelink | Sept. 12, 1961 |
| 3,004,252 | Zola et al. | Oct. 10, 1961 |
| 3,024,443 | Barker et al. | Mar. 6, 1962 |